July 3, 1962 W. C. JOHNSON 3,042,790
PROCESS OF ELECTRIC ARC WELDING, MACHINE AND WELD INSERT
Filed Feb. 8, 1960 2 Sheets-Sheet 1
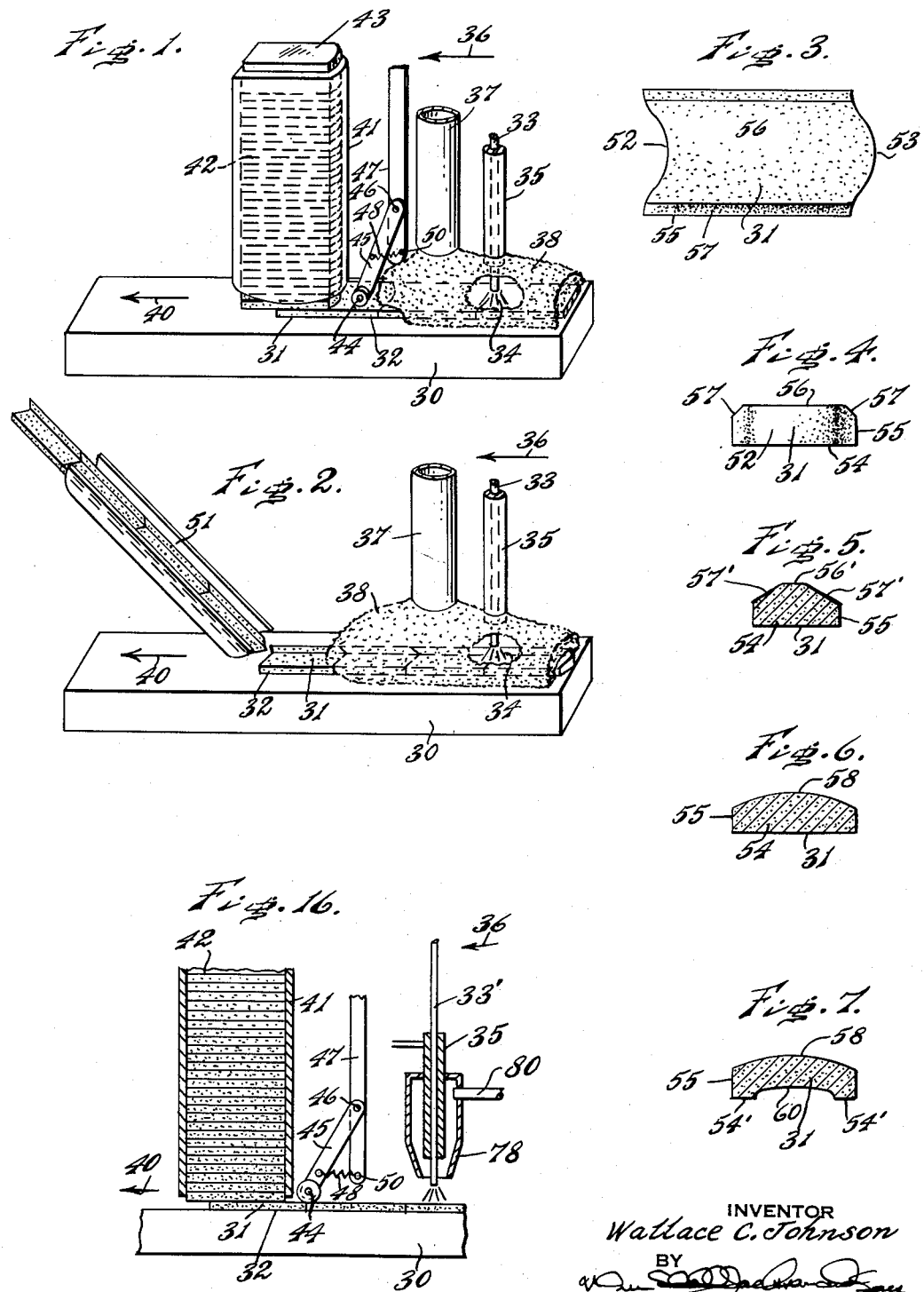
INVENTOR
Wallace C. Johnson
BY
ATTORNEYS

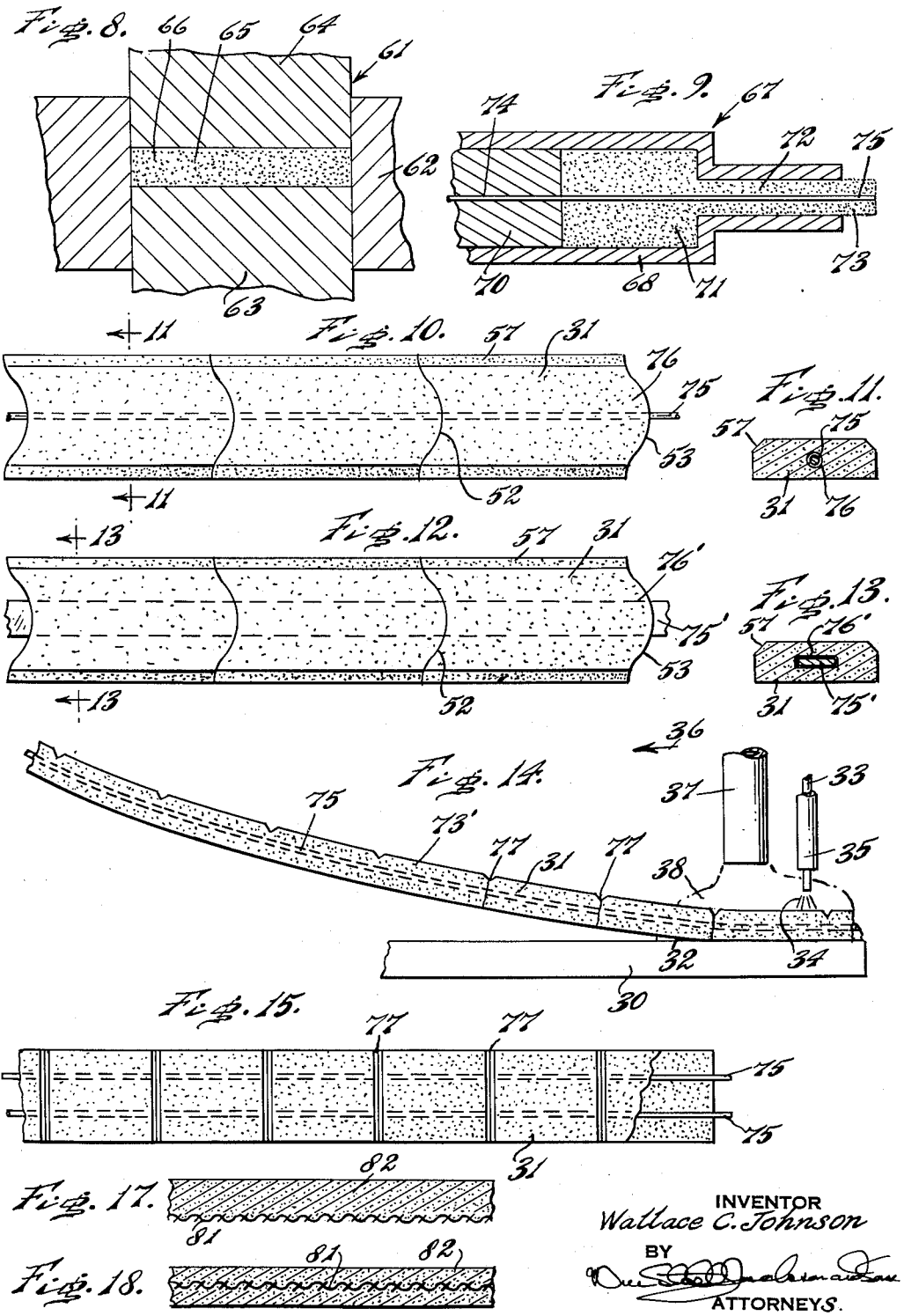

United States Patent Office 3,042,790
Patented July 3, 1962

3,042,790
PROCESS OF ELECTRIC ARC WELDING, MACHINE AND WELD INSERT
Wallace C. Johnson, Hamden, Conn., assignor to Arcos Corporation, Philadelphia, Pa., a corporation of Pennsylvania
Filed Feb. 8, 1960, Ser. No. 7,213
24 Claims. (Cl. 219—73)

The present specification relates to electric arc welding using consumable weld preforms applied to the work, to apparatus therefor and to the weld preforms themselves.

A purpose of the invention is to permit precise determination and control of weld analyses without regard to the use of wrought alloys, by taking a portion of the weld metal from weld preforms which comprise aggregates of bonded metal powders, laid in the weld, cold, against the base metal, and completely melted at one pass by the arc from a consumable electrode.

A further purpose is to decrease the penetration of a weld bead into the base metal or work so as to minimize the influence of the work composition on the weld bead by dilution.

A further purpose is to deflect the arc from a consumable welding electrode by a preform against the work, so that the arc will not deeply penetrate the work.

A further purpose is to improve the quality of single layer multiple pass overlays on steel and other metals.

A further purpose is to permit precise control of the cross section of the preform laid on the base metal or work, so that the resistance of the melting arc will be uniform and the voltage and current used in welding will be capable of accurate regulation.

A further purpose is to avoid segregation of ingredients which are present in a weld bead. This is particularly important when there is a great difference in density and composition of ingredients.

A further purpose is to use a preform placed on the base metal or work, which preform is thick at the middle where the arc is held and thin at the edges in cross section.

A further purpose is to provide a cross section of a laid-in preform which will be spaced from the work at a certain position, suitably in the middle, and elsewhere in electrical contact with the work.

A further purpose is to provide interlocks on the front and back ends of the preform slugs.

A further purpose is to interconnect parts of the preform by a wire or wires or metal strip running longitudinally through the preform.

Further purposes appear in the specification and in the claims.

In the drawings I have chosen to illustrate a few only of the numerous embodiments in which the invention may appear, selecting the forms from the standpoints of convenience in illustration, satisfactory operation and clear demonstration of the principles involved.

FIGURE 1 is a fragmentary diagrammatic perspective of one embodiment of the invention.

FIGURE 2 is a fragmentary diagrammatic perspective showing a further embodiment.

FIGURE 3 is a top plan view of a modified type of preform slug useful in the invention.

FIGURE 4 is a front elevation of FIGURE 3.

FIGURE 5 is a cross section of a further modified type of preform slug.

FIGURE 6 is a cross section of another modified type of preform slug.

FIGURE 7 is a cross section of a still further type of preform slug of the invention.

FIGURE 8 is a central vertical diagrammatic section showing the molding of an individual preform slug.

FIGURE 9 is an axial section showing the extrusion of a line of preform slugs according to the invention.

FIGURE 10 is a top plan view of a line of preform slugs which are held together by a connecting wire.

FIGURE 11 is a section on the line 11—11 of FIGURE 10.

FIGURE 12 is a plan view of a line of preform slugs which are interconnected by a flat wire or strip.

FIGURE 13 is a section on the line 13—13 of FIGURE 12.

FIGURE 14 is a fragmentary diagrammatic side elevation showing welding with a modified preformed strip according to the invention.

FIGURE 15 is a top plan view of the strip of FIGURE 14 partly broken away to show the interior.

FIGURE 16 is a fragmentary diagrammatic perspective of a modified device for welding similar to FIGURE 1, by using an inert protective gas instead of submerged arc welding as in FIGURE 1.

FIGURES 17 and 18 are fragmentary longitudinal sections showing portions of variant preforms unwinding from a roll, and particularly advantageous for 3 o'clock welding, such as arc-cladding the interior of large vessels.

Describing in illustration but not in limitation and referring to the drawings:

It is desirable in many cases to provide weld analyses which are not readily obtainable from wrought alloys, for example because of difficulty in hot or cold working or fabricating of such alloys.

The present invention makes possible laying down weld beads either in a weld groove or from overlay purposes which are suitably of an analysis which may not be readily obtainable in wrought form for fabrication into a consumable welding electrode.

One of the features of the invention is that penetration of the arc into the base metal or work can be precisely controlled, so that the extent of dilution is very limited, and the analysis of the weld bead will be chiefly contributed by metal of the preform later to be described and of the consumable welding electrode, used with the preforms.

By the invention the resistance of the arc circuit can be accordingly controlled and maintained very uniform, so that precise regulation of welding voltage and current will be possible throughout the welding operation.

By the invention a large amount of the filler metal is provided by preform elements, desirably slugs, which consist of aggregated metal powders. By this it is meant that the metal powders are bonded together to form a solid block or strip. This bonding may be adhesive bonding, or metallurgical bonding of the type present in a sintered powder metal compact, or a combination of such types of bonding.

The preform elements or slugs as later explained are conveniently of varying cross sections to suit the need of the particular installation, and to best avoid difficulty through excessive penetration. In some of the cross sections which may be used, air space is provided directly beneath the arc and between the preform and the work with a view to further reducing penetration of the arc into the work.

When reference has been made herein to the fact that the preform is made of metal powders, it is intended to include also metal fibers which may be used to replace the powders or in admixture with the powders.

It will be evident also that while in most cases the preform will consist substantially entirely of metal powder (including fiber), in some cases it may be desirable to include flux in the preform, in which case the fluxing ingredients may be introduced as powder, or as fiber, for example fibrous glass, wollastonite, slag, or other materials used in electrode coatings, in proportions of 2 to 40% by weight of the preform, preferably 2 to 20%. Gas forming ingredients such as organic material may be included to perform the shielding function.

The preforms are suitably introduced as separate increments, called herein slugs, as interrelated or interconnected slugs, or as slugs which are interconnected and adapted to be cracked, for example at break points or notches, so as to fit against the curved surfaces of a pipe or tank.

It is believed that one of the widest applications of the invention will be in arc-cladding or overlaying of plain carbon steel with corrosion resisting steel or alloy such as chromium-nickel, or straight chromium stainless steel, Inconel, etc. The very low dilution will then limit carbon pickup and also limit dilution of chromium and nickel. Whereas in the prior art it has been common to obtain up to 40% penetrations of the order of ¼ to ½ inch in deep single arc submerged arc welding, it is possible by the present invention to limit the penetration to 5% at about ¹⁄₁₆ inch deep. By virtue of the fact that there is less penetration, it is no longer necessary to apply from 3 to 4 successive layers in order to offset dilution, and in many instances a single layer is sufficient.

It is also true that the limit on penetration is beneficial in reducing hot cracking, underbead cracking and toe cracking, and low impact values adjacent the weld which have been frequently encountered in welding low alloy steels by the prior art. The tendency for trapping of slag and thus forming stress raisers is also reduced in single pass welds by limiting penetration. In deep groove welding the limit on penetration cuts down undercutting of both walls.

The invention is applicable both in submerged arc welding and in exposed weld inert gas protected welding of the consumable metallic arc type.

It is believed that the invention will find wide application in arc-cladding heavy reactors and pressure vessels.

By the present invention the carbon pickup when arc-cladding stainless steel onto AISI 1030 steel in the first stainless steel layer is about the same as the carbon pickup obtained in the prior art from the third layer of weld bead.

Considering now the drawings in detail, I illustrate the work as consisting of a plate 30 of plain carbon steel, alloy steel or other suitable base metal, which in FIGURE 1 is being arc-clad or overlayed.

In order to accomplish the overlaying, I lay down in line ahead of the weld a succession of preform slugs 31 which are generally elongated and of rectangular cross section. By this it is meant that they are at least once and a half as long as they are wide and preferably several times as long as they are wide, and that they are substantially thinner than they are wide. There is a flat bottom edge 32 which rests upon the work plate 30 in electrical contact with the work plate as shown.

The dimensions of the slug 31 will vary in individual installations. Good results have been obtained where the slug varied in width between ⅜ and ¾ inch for a single arc and between ¾ and 1¼ inches for a double arc side by side. The total cross section of the slug for a single arc will preferably be between ³⁄₃₂ and ⅜ square inch. The thickness will suitably be of the order of ⅛ inch to ½ inch and preferably about ⅜ inch in the optimum form. The length of the slug will preferably vary between 1 inch and 6 inches and the optimum length will preferably be about 2 inches in many cases.

A consumable metallic electrode 33 is maintained in proper arcing distance from the preform slug on the work under suitable feed mechanism to maintain proper spacing for arc 34.

The consumable metallic electrode 33 is fed to the work through a suitable guide and contact tube 35 as well known.

Ahead of the electrode 33 in the direction of the arrow 36, which indicates the direction of travel of the welding mechanism, there is a suitable feed tube 37 through which a regular submerged arc welding flux 38 is laid down on top of the line of slugs 31 so as to submerge the arc, and confine it to the top center of the slugs. Thus no side flash-outs are possible. The blanket of flux also helps hold the slugs in position, pressing on the work.

The slugs are deposited in a line of slugs suggested by the arrow 40, which indicates direction, by any suitable mechanism, which in FIGURE 1 is a feed hopper 41 on the welding machine carrying a stack of slugs 42 fed downward under gravity pressure from a weight 43 and dropping on to the work and successively sliding off the top of the preceding slug which is engaged by a pressure wheel 44 urged downward by lever arm 45 pivoted at 46 on support 47 from the welding machine and resiliently biased by tension spring 48 acting from spring abutment 50 on support 47.

Any other suitable way of laying down the slugs in line may be employed, and in FIGURE 2 I illustrate a feed chute 51 down which longer slugs 31 are sliding, the chute being progressed in the direction of the arrow 36 by the welding machine ahead of the flux feed tube 37 and in line with the submerged arc 34.

In FIGURE 1 I illustrate slugs which are truly rectangular, having flat sides on all 6 faces. There may be special reasons, however, for departing from this form.

The slug as shown in FIGURES 2, 3 and 4 has a groove or recess 52 at one forward or rearward end and a tongue projection 53 at the other rearward or forward end so that the tongue of one slug will fit in the groove of the next slug and maintain the line of slugs against slipping out of place laterally.

In this form also the bottom 54 of the slug is flat clear across and the lower sides 55 extend straight up and the top 56 is flat parallel with the bottom but the corners where the sides join the top are bevelled at 57 so that the mass of material in cross section diminishes toward the edges.

This has the advantage that it is thicker in the center where the plowing action of the arc is much greater, with the heat from the arc decreasing over the side edges of the slug. This insures that all of the slug will be fully fused or melted, with less chance of over-rolling. In some cases it is desirable to use more extensive bevelling as shown at 57' in FIGURE 5, resulting in a rather narrow flat portion 56' at the center of the top which is at least ¼ inch wide. In this case the overall width is reduced as compared with the form of FIGURES 3 and 4 to show that there is no requirement for a particular width within the general limits suggested.

In some cases it is preferable to accomplish the thickening at the middle of the cross section and the thinning at the edges by using a top form of arcuate shape as shown at 58 in FIGURE 6. Here again the thickness is greatest at the middle.

In some cases it is desirable in order to further reduce penetration of the arc, when using 800 to 1000 amperes, to provide an air space beneath the arc and between the slug and the adjoining surface of the work. This is illustrated in FIGURE 7, where flats 54' are provided at the outer edge of the cross section to make proper electrical contact with the work, and a recess 60 extends longitudinally along the middle to clear from contact with the work. The recess 60 may also be filled with a protective gas such as helium, argon or carbon dioxide if desired.

The preform slug of the invention may be manufactured using powder metallurgy methods or refractory brick making methods as desired, starting with a suitable blend of metal powders.

In FIGURE 8 I illustrate a molding press 61 having sides 62, a bottom die 63, a top die 64 and a mold cavity 65 into which a mass of metal powders or fibers 66 is placed with suitable binder. The top die 64 moves toward the bottom die 63 to apply pressure.

The bulk of the material of the slug will suitably be a mixture of metal powders and/or fibers, for example iron, chromium, nickel, molybdenum, manganese, copper, titanium, columbium, zirconium, tungsten, aluminum, vanadium, cobalt and the like, alone or in combination, and added in the form of the metals or the ferroalloys or any suitable addition material which will produce the metal of desired composition.

There will suitably be a binder, which in the preferred embodiment will be sodium silicate. Good results are obtained using sodium silicate of 30° Baumé which has a ratio of $Na_2O$ to $SiO_2$ of 1 to 3.22. The proportion of dry sodium silicate on the dry weight of the finished preform slug will be between 5 and 20% and preferably about 15%.

In some cases it is preferable to use a more concentrated sodium silicate solution, for example 47° Baumé sodium silicate, having a ratio of $Na_2O$ to $SiO_2$ of 1 to 2.9. In this case the quantity of sodium silicate on the dry weight of the slug will suitably be about 16%.

If desired an organic binder such as glucose, dextrine or the like can be used to liberate carbon dioxide.

It is decidedly preferable to use the less concentrated sodium silicate in order to obtain better electrical conductivity in the preform slug, since with the 30° Baumé sodium silicate the high electrical conductivity of the preform slug permits starting the arc by arcing directly against the preform slug, while when 47° Baumé sodium silicate is used the preform slug is of such high electrical resistance that it is necessary to start the arc by using a starting block as well known in the art.

In some cases it is desirable to incorporate with the sodium silicate a binder addition of from ½ to 3% of bentonite calculated on the weight of the metal ingredients as 100%.

The composition of the preform slug may include fluxing materials, for example from 2 to 40% of flux which may be introduced as glass wool or slag wool fiber having a composition in the following range:

| | Percent |
|---|---|
| Titanium oxide | 60 to 85 |
| Manganese monoxide | 4 to 20 |
| Silica | 8 to 25 |
| Balance mainly ferrous oxide, alumina, lime, magnesia and alkalis in proportions of 0 to 8% each. | |

It will be evident of course that the flux is incorporated either in the form of powders or fibers.

In some cases it is preferable to associate the preform with a fibrous strip, for example of glass fabric, which will feed from a roll or other source of preform, permitting bending and protecting against loss of continuity in feed in case the preform cracks.

Also in the preferred form the fibers, when they fuse in the arc, will contribute to the flux. This is particularly true in vertical arc welding of various types including 3 o'clock welding of plates, for example in lining pressure vessels such as paper mills digesters.

In FIGURE 17 I illustrate a glass fiber tape 81 which is united as by coextrusion to a preform 82 composed of metallic particles as before explained. In this case, the glass tape is at one side, suitably the side adjoining the work. For the sake of good electrical contact, the metal particles penetrate the interstices of the tape.

In order to obtain more effective electrical contact to the work and also maintain easy starting of the arc, I will preferably place the glass tape or the like 81 in the interior of the preform 82 as shown in FIGURE 18 as by coextrusion.

In most cases, however, it is believed to be preferable to produce the preform without the addition of fluxing ingredients, using only metal powders and binder.

Once the green compact is molded as shown in FIGURE 8, it is preferably baked to eliminate water at a temperature in the range between 400 and 900° F. and preferably about 600° F. for a time of at least 4 hours.

As an alternate procedure, the sodium silicate may be eliminated altogether, and the green compact after molding may be sintered using powder metallurgy technique suitably by heating in an atmosphere of hydrogen to a temperature of 1200 to 1700° F. for a time of at least 5 minutes.

In some cases the preform slugs may be extruded, and in that case they may be strung on a wire or extruded about a wire.

In FIGURE 9 I illustrate an extrusion press 67 having an extrusion chamber 68 provided with an extrusion ram 70 which is applying pressure to a mass of particles of the character already described shown at 71 to extrude through a suitable die 72 and produced preform slugs 73.

In the form shown an opening 74 extends longitudinally through the ram and receives a metallic wire 75 which is fed forward with the extrusion and is molded at the interior of the preform.

The wire may be of iron or plain carbon steel, or it may be of one of the alloy materials which is available in wire form, such as stainless steel.

It will be evident that depending on the particular application, it may be preferable to use a plain carbon steel consumable electrode and obtain all the alloys from the preform or it may be desirable to use an alloy consumable electrode and supply part of the alloy from the preform, or the preform may be low carbon iron to prevent penetration, and the electrode may be highly alloyed stainless steel. This will influence the choice of composition for the wire 75.

In some cases it is preferable to mold the slugs 31 in the form shown in FIGURES 3 and 4 with front and back grooves and tongues as shown, but provide a longitudinal opening 76 running through the middle and string the slugs like beads on a wire 75. This has the advantage that suitable freedom for bending the line of slugs to conform to any desired curve is provided. These can be supplied in a coil.

In some instances as shown in FIGURES 12 and 13 the longitudinal opening through the slugs at 76' is made of rectangular shape and a flat wire or strip 75' is used for threading the slugs like beads. In this case the flat wire or strip 75' may be of plain carbon steel or of alloy as desired.

In some cases it is better to make a continuous extrusion 73' of the preform, with wire or flat strip 75 extending through it and to provide transverse notches 77 suitably across the top at which the material can be broken in order to bend the strip to conform with a desired curvature.

In this case as shown in FIGURE 14 the succession of preformed slugs is fed in line and the arc 34 takes place at the top of the slugs over the work.

In the form of FIGURE 15 it is preferable to employ a plurality of retaining wires 75 running longitudinally through the preform to prevent lateral twisting.

In some cases it is preferable to employ an exposed arc with protection by inert gas. Thus I illustrate in FIGURE 16 an electrode 33' fed through a guide tube 35 within a shield 78 which receives an inert gas such as helium, argon or carbon dioxide through a pipe 80 and which has the flux supplied through a core or interior of the electrode and the preform slugs laid down ahead of the arc as already described.

In operation according to the invention, the electrical circuit will connect one terminal to the electrode and one terminal to the work, the preform being electrically conducting and in contact with the work. The welding may be by direct current, either straight or reverse polarity, or alternating current. Current for each arc will preferably be in the range from 250 to 900 amperes at a voltage of 28 to 45 volts, the preferable current being about 600 amperes. The speed of progression will usually be 10 to 20 inches per minute.

The alloys which will be produced by welding will suitably be any of the corrosion resisting or heat resisting alloys such as type 300 or type 400 stainless steel. The preform slug in this case will have a considerable excess of chromium or of chromium-nickel as the case may be and will also suitably contain deoxidizers such as silicon, titanium, vanadium, aluminum or the like, in proportions of 0 to 20% and preferably 2 to 20% by weight. The alloy thus formed may also be of the high nickel type such as Inconel. Or by using a combination of nickel and copper particles under an arc of nickel or copper wire, a one-layer Monel overlay can be produced.

A suitable weld bead composition according to the present invention is Carpenter 20 which contains approximately 20% of chromium, 29% of nickel, 3% molybdenum and 8% copper, balance iron.

*Example I*

In this example the composition of the preform slugs was as follows:

|  | Percent |
|---|---|
| Powdered ferrochrome, low carbon grade | 40 |
| Iron powder, low carbon grade | 24 |
| Nickel powder | 20 |
| Ferromolybdenum powder | 16 |

There was 16% of liquid sodium silicate of 30° Baumé on the dry weight of the preform.

The preform was dried at room temperature for 2 hours and baked for 4 hours at 600° F.

The consumable metallic welding electrode used was stainless type 308, 5/32 inch diameter bare wire.

The cover flux had the following analysis:

|  | Percent |
|---|---|
| Fluorspar | 8 |
| Limestone | 10 |
| Bentonite | 2 |
| Wollastonite | 79 |
| Aluminum powder | 1 |

Sodium silicate (1 to 2.9 ratio of Na$_2$O to SiO$_2$) was used, 30 parts liquid to 100 parts of dry powder, and the flux was baked at 850° F. for 4 hours.

The work or base plate consisted of AISI 1030 steel plates, on which an overlay was being made.

Welding was carried on at from 40 to 45 volts A.C., in various current ranges between 500 and 750 amperes with best results at 650 amperes. The speed of travel of the welding machine was 10 inches per minute.

The chemical composition of the weld deposit in the first pass of the overlay was as follows:

|  | Percent |
|---|---|
| Carbon | 0.057 |
| Manganese | 0.48 |
| Silicon | 0.88 |
| Chromium | 20.25 |
| Nickel | 13.90 |
| Molybdenum | 3.62 |
| Balance iron. | |

The welds were sound and free from cracks.

*Example II*

The composition of the preform was as follows:

|  | Percent |
|---|---|
| Ferrochrome, low carbon grade | 10 |
| Iron powder, low carbon grade | 15 |
| Powdered copper | 12 |
| Nickel powder | 43 |
| Ferromolybdenum powder | 20 |

This material was suitably formed into a preform. A consumable welding electrode of stainless steel type 310, 5/32 inch diameter, bare wire was used. The weld was run under a covering flux as given in Example I, at 500 amperes A.C., 34 to 36 volts, at a speed of travel of 10 inches per minute.

The weld bead analysis was as follows:

|  | Percent |
|---|---|
| Carbon | 0.093 |
| Manganese | 1.0 |
| Silicon | 0.7 |
| Sulphur | 0.010 |
| Phosphorus | 0.019 |
| Chromium | 16.35 |
| Nickel | 22.48 |
| Molybdenum | 2.78 |
| Copper | 2.47 |
| Balance iron. | |

The weld was sound and free from cracking, and was capable of undergoing a side bend without failure.

*Example III*

A preform was made using the technique of Example I and having the following composition:

|  | Percent |
|---|---|
| Powdered ferrochrome, low carbon grade | 43 |
| Iron powder, low carbon grade | 40 |
| Ferro columbium | 2 |
| Nickel powder | 15 |

A cover flux was used as in Example I. The welding was preformed with a type of 308 stainless steel wire at 500 amperes A.C., 35 to 40 volts, and 10 inches per minute travel speed. The wire diameter was 5/32 inch.

The composition of the weld deposit on mild steel was as follows:

|  | Percent |
|---|---|
| Carbon | 0.087 |
| Manganese | 0.63 |
| Silicon | 0.64 |
| Sulphur | 0.015 |
| Phosphorus | 0.035 |
| Chromium | 17.20 |
| Nickel | 9.48 |
| Columbium | 0.10 |
| Balance iron. | |

The welds were sound and ductile.

It is important in the present invention that the dimensions of the preform slug and the consumable welding electrode and the electrical energy be interrelated as indicated in the example above so that the slug is completely melted and the surface of the work fused together in a single pass, in order that the welding bead will be formed from a combination of the preform slug, the wire if any in the preform slug, the consumable metal electrode and the surface of the work all of which are melted in the single pass.

It will be evident that one of the important aspects of the present invention is that the penetration of the weld is limited by the preform slug and there is not a deep puddle of metal melted from the surface of the work as in the prior art.

While several different forms of mechanism for laying down the preform slug have been shown, it will be evident that any technique which lays down the preform slugs like a carpet ahead of the arc can be used, and in fact if desired the slugs can be laid down by hand.

In the usual case the analysis of the preform slug will be substantially different from that of the work, although in some cases it may be the same as that of the work, especially in deep groove welding.

While, in the examples given, which involved a submerged arc process, a particular submerged arc cover flux having a particular composition was mentioned, the particular type of cover flux used is not vital.

Any flux that is suitable for submerged arc welding, including any of the commercial fluxes now successfully on the market for that purpose, would do as a cover flux.

In view of my invention and disclosure, variations and modifications to meet individual whim or particular need will doubtless become evident to others skilled in the art, to obtain all or part of the benefits of my invention without copying the process, apparatus and structure shown, and I, therefore, claim all such insofar as they fall within the reasonable spirit and scope of my claims.

Having thus described my invention what I claim as new and desire to secure by Letters Patent is:

1. The process of electric arc welding, which comprises molding metallic power into metallic slugs, laying down a line of metallic slugs along and in electric contact with the work, maintaining an arc between a consumable welding electrode and the successive slugs, applying flux to the arc, and progressing the electrode and the arc longitudinally of the line of slugs while maintaining a heat input which completely melts the slugs at a single pass and forms a weld puddle of molten metal, including metal from the work, metal from the slugs and metal from the consumable electrode.

2. The process of electric arc welding, which comprises laying down a line of preform slugs composed of bonded metal powder along and in electric contact with the work, maintaining an arc between a consumable welding electrode and the preform slugs, supplying flux to the arc, and progressing the electrode and the arc longitudinally of the line of preform slugs while maintaining a heat input which completely melts the line of slugs at a single pass and forms a weld puddle of molten metal, including metal from the work, metal from the slugs and metal from the consumable electrode.

3. The process of electric arc welding, which comprises laying down a succession of preform metallic slugs composed of aggregated metal powder along and in electric contact with the work, interlocking the forward end of one slug with the rearward end of the slug ahead of its, maintaining an arc between a consumable welding electrode and the preform metallic slugs, supplying flux to the arc, and progressing the electrode and the arc longitudinally of the line of preform metallic slugs while maintaining a heat input which completely melts the metallic slugs at a single pass and forms a weld puddle of molten metal, including metal from the work, metal from the slugs and metal from the consumable electrode.

4. The process of electric arc welding, which comprises laying down a succession of preform metallic slugs along and in electric contact with the work, said slugs having a cross section which is thick at the middle and thin at the edges, maintaining an arc between a consumable welding electrode and said slugs with the center of the arc aligned with the middle of the cross section of the slugs, supplying flux to the arc, and progressing the electrode and the arc longitudinally of the line of slugs while maintaining a heat input which completely melts the slugs at a single pass and forms a weld puddle of molten metal, including metal from the work, metal from the slugs and metal from the consumable electrode.

5. The process of electric arc welding, which comprises laying down a metallic preform composed of aggregated metal powder along and in electric contact with the work, said preform having a metallic wire extending longitudinally thereof, maintaining an arc between a consumable welding electrode and the preform, supplying flux to the arc, and progressing the electrode and the arc longitudinally of the preform while maintaining a heat input which completely melts the preform and the wire at a single pass and forms a weld puddle of molten metal, including metal from the work, metal from the preform, metal from the wire and metal from the consumable electrode.

6. The process of electric arc welding, which comprises laying down along and in electric contact with the work, a metallic preform composed of a plurality of slugs of aggregated metal powder and a longitudinally extending interconnecting wire through the slugs, maintaining an arc between a consumable welding electrode and the line of slugs, supplying flux to the arc, and progressing the electrode and the arc longitudinally of the line of slugs while maintaining a heat input which completely melts the slugs and the wire at a single pass and then forms a weld puddle of molten metal, including metal from the work, metal from the slugs, metal from the wire and metal from the consumable electrode.

7. The process of electric arc welding, which comprises laying down a metallic preform along and in electric contact with the work, said preform consisting of a strip of aggregated metal powder notched at intervals and a wire extending longitudinally through the preform, maintaining an arc between a consumable welding electrode and the preform, supplying flux to the arc, and progressing the electrode and the arc longitudinally of the preform while maintaining a heat input which completely melts the preform and the wire at a single pass and forms a weld puddle of molten metal, including metal from the work, metal from the preform, metal from the wire and metal from the consumable electrode.

8. The process of electric arc welding, which comprising laying down a succession of preform metallic slugs along and in electric contact with the work, said slugs being aggregates of metal power, and having a cross section which engages the work at the edges and is spaced from the work between the edges, establishing an arc between a consumable welding electrode and the slugs at a point in the cross section where the slugs are spaced from the work, applying flux to the arc, progressing the electrode and the arc longitudinally of the line of slugs while opposite a point at which the slugs are spaced from the work, and supplying heat input sufficient to completely melt the slugs at one pass.

9. The process of electric arc welding, which comprises laying down a succession of slugs composed of aggregates of metal powder along and in electric contact with the work, establishing an arc between a consumable welding electrode and the line of slugs, supplying flux to the arc and submerging the arc beneath the flux, progressing the electrode and the arc longitudinally of the line of slugs while continuously submerging the arc and maintaining the arcing between the consumable electrode and the slugs and supplying heat input sufficient to completely melt the slugs at one pass.

10. In mechanism for welding, a consumable metallic welding electrode, means for progressing the electrode along the work, means for laying down against and in electric contact with work in the path travelled by the electrode a plurality of metal slugs in line one behind another, and means for maintaining an arc between the electrode and the line of metal slugs.

11. In mechanism for welding, a consumable metallic welding electrode, means for progressing the welding electrode along the work, means for laying down against and in electric contact with the work in the path of the electrode a line of preformed metal powder aggregated into a solid mass, said preformed solid mass following the line ahead of the electrode, means for maintaining an arc between the electrode and said preformed solid mass in contact with the work and means for depositing flux ahead of the arc.

12. In mechanism for welding, a consumable metallic welding electrode, means for progressing the electrode along the work, means for laying down in the path ahead of the electrode and in electric contact with the work a succession of metallic slugs each of which consists of an aggregate of powdered metal, means for maintaining an arc between the electrode and the line of slugs, and means for depositing flux along the line of slugs progressing with the arc.

13. In mechanism for welding, a consumable metallic welding electrode, means for progressing the electrode along the work, means for laying down against and in electric contact with the work in the path of the electrode and ahead of the electrode preforms of aggregated metal powder having a cross section which is thick in the middle and thin at the edges, means for maintaining an arc between the electrode and the thick portion of the preforms, and means for depositing flux along the preforms progressing with the arc.

14. In mechanism for welding, a consumable metallic welding electrode, means for progressing the electrode along the work, means for laying down against and in electric contact with the work in the path of the electrode and ahead of the electrode metallic preforms of aggregated metal powder having a cross section which engages the work at a portion of the width and which is free from the work at another portion of the width, means for maintaining an arc between the electrode and the preforms, said arc being maintained at a position at which the preforms are spaced from the work, and means for depositing flux progressing with the arc.

15. In mechanism for welding, a consumable welding electrode, means for progressing the electrode along the work, means for laying down against the work a succession of preform metallic slugs composed of aggregated metal powder and including an interconnecting wire which runs longitudinally, means for maintaining an arc between the electrode and said preform slugs, and means for depositing flux progressing with the arc.

16. In mechanism for welding, a consumable welding electrode, means for progressing the electrode along the work, means for laying down against and in electric contact with the work in the path of the electrode and ahead of the electrode a metallic preform composed of aggregated metallic powder and having a wire running longitudinally through the preform, means for maintaining an arc between the electrode and the preform, and means for depositing flux on the preform progressing with the arc.

17. A metallic consumable weld slug comprising a preform of metallic powder having a cross section which is relatively wide and relatively thin and having a side which has flat portions adapted to rest upon the work, the preform being constructed to melt to form a weld alloy.

18. A preform of claim 17, having interlock portions at opposite ends which interconnect a succession of preforms into a line.

19. A preform of claim 17, which is thick in the middle and thin at the edges.

20. A preform of claim 17, which is recessed at the side adapted to engage the work so that it will remain spaced from the work.

21. A metallic consumable weld strip, comprising a longitudinally extending wire and a succession of preforms of aggregated powder surrounding the wire, the preforms having a cross section which is substantially wider than it is thick and adapted to rest against the work.

22. A weld strip of claim 21, in which the successive preforms are initially separate.

23. A weld strip of claim 21, in which the successive preforms are separated by notches and adapted to break apart at the notches.

24. A welding strip of claim 23, in which there are two wires running longitudinally through the preform in the strip.

References Cited in the file of this patent

UNITED STATES PATENTS

| | | |
|---|---|---|
| 405,345 | Coffin | June 18, 1889 |
| 1,589,017 | Lincoln | June 15, 1926 |
| 2,175,607 | Kinkead | Oct. 10, 1939 |
| 2,189,399 | Lewbers | Feb. 6, 1940 |
| 2,277,107 | Imes | Mar. 24, 1942 |
| 2,330,289 | Keir | Sept. 28, 1943 |
| 2,362,505 | Smith | Mar. 18, 1944 |
| 2,372,202 | Hensel et al. | Mar. 27, 1945 |
| 2,562,132 | Senft | July 24, 1951 |